(12) United States Patent
Chen

(10) Patent No.: US 7,393,132 B2
(45) Date of Patent: *Jul. 1, 2008

(54) BACKLIGHT MODULE WITH NANO-MATERIAL LIGHT COUPLING LAYER

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 177 days.

This patent is subject to a terminal disclaimer.

(21) Appl. No.: 11/262,595

(22) Filed: Oct. 31, 2005

(65) Prior Publication Data

US 2006/0092669 A1    May 4, 2006

(30) Foreign Application Priority Data

Oct. 29, 2004   (TW) .............................. 93132946 A

(51) Int. Cl.
*F21V 7/04* (2006.01)
(52) U.S. Cl. .................. 362/620; 362/626; 362/617; 362/623; 349/65; 385/129; 385/901
(58) Field of Classification Search ................ 362/614, 362/620, 622, 626, 618, 26, 55; 385/129, 385/901; 349/65
See application file for complete search history.

(56) References Cited

U.S. PATENT DOCUMENTS

| | | | | |
|---|---|---|---|---|
| 5,584,556 A | * | 12/1996 | Yokoyama et al. | .......... 362/625 |
| 5,718,497 A | * | 2/1998 | Yokoyama et al. | .......... 362/625 |
| 5,851,062 A | | 12/1998 | Shinohara et al. | |
| 5,999,685 A | | 12/1999 | Goto et al. | |
| 6,860,753 B2 | | 3/2005 | Wang | |
| 6,976,780 B2 | * | 12/2005 | Lee et al. | ..................... 362/622 |
| 7,040,796 B2 | * | 5/2006 | Sugiura et al. | .............. 362/608 |
| 7,160,018 B2 | * | 1/2007 | Chen et al. | .................. 362/620 |
| 2002/0141173 A1 | * | 10/2002 | Lee et al. | ...................... 362/26 |
| 2006/0109682 A1 | * | 5/2006 | Ko et al. | ..................... 362/607 |

FOREIGN PATENT DOCUMENTS

| | | |
|---|---|---|
| CN | 1371018 A | 9/2002 |
| CN | 2586971 Y | 11/2003 |
| CN | 1468383 A | 1/2004 |
| CN | 1489711 A | 4/2004 |

* cited by examiner

*Primary Examiner*—Ismael Negron
(74) *Attorney, Agent, or Firm*—Morris Manning Martin LLP; Tim Tingkang Xia, Esq.

(57) ABSTRACT

A backlight module (10) includes a flat cold cathode fluorescent lamp (CCFL) (30) having an output interface, and a light guiding plate (20). The output interface has a nano-material layer coated thereon. The light guiding plate includes an incidence interface (21), an emission interface (23), and a reflection interface (22), wherein the emission interface and the reflection interface respectively have nano-sized V-shaped grooves provided thereat. A pitch of the V-shaped grooves of the emission interface gradually increases from the incidence interface to a side of the light guiding plate distal from the incidence interface, and a pitch of the V-shaped grooves of the reflection interface gradually increases from the incidence interface to the side of the light guiding plate distal from the incidence interface.

20 Claims, 2 Drawing Sheets

BACKLIGHT MODULE WITH NANO-MATERIAL LIGHT COUPLING LAYER

FIELD OF THE INVENTION

The present invention relates to backlight modules such as those used in liquid crystal display (LCD) panels, and particularly to a backlight module having improved illumination performance.

BACKGROUND ART

Cathode ray tube (CRT) display technology has been widely used for several decades. The main advantages of CRT displays are their excellent display performance and their low price. However, the large size and high operating voltage of CRTs makes them unsuitable for some applications.

In recent years, various flat panel displays has been developed, particularly with a view to achieving the same display performance as CRT displays. A liquid crystal display (LCD) panel is one type of flat panel display device that can be readily mass-produced. The lightness and slimness of LCD panels make them suitable for a wide variety of uses, such as in personal digital assistants (PDAs), notebook personal computers, and other information appliances.

Because the liquid crystal of an LCD panel cannot emit light by itself, in general, a backlight module needs to be employed in the LCD panel. Many key characteristics for evaluating the performance of an LCD display depend on the backlight module employed. In particular, high illumination performance, low power consumption, and a small size are desired. Improved illumination performance has become a key goal of many LCD developers and manufacturers in recent times.

A typical backlight module comprises a light guiding plate, a reflector sheet, a prism sheet, a diffusion sheet, and a cold cathode fluorescent lamp (CCFL). The light guiding plate has an incidence interface, an emission interface, and a reflection interface opposite to the emission interface. In order to increase the optical brightness and uniformity of the backlight module, U.S. Pat. No. 5,851,062 discloses a backlight module including a prism sheet on which a periodic pattern is formed. A cross-section of a smallest unit of the periodic pattern is shaped like an M. The M-shape includes a long positive-sloping surface, a short negative-sloping surface, a short positive-sloping surface, and a long negative-sloping surface.

However, the very need for a prism sheet is being increasingly considered to be inconsistent with the ongoing industry trend toward miniaturizing backlight modules and LCD panels and decreasing cost.

U.S. Pat. No. 6,860,753 discloses a light source for a flat panel display device. The light source is generally a tube-shaped lamp. However, light is emitted from the lamp tube in various different directions. Some of the light may be absorbed by a housing of an associated backlight system, or may reach an associated light guiding plate after being repeatedly reflected. These problems may significantly reduce the efficiency of illumination. Indeed, it is widely held that one of the principle shortcomings of a conventional LCD panel is poor light transmission efficiency. That is, a high percentage of light generated by the backlight system is absorbed by various components of the LCD panel. The light transmission efficiency of a typical LCD panel is generally about 5% to 10%. The light transmission efficiency is degraded not only during transmission from the backlight system to the light guiding plate, but also during transmission through attached functional optical sheets such as reflector sheets, prism sheets and diffusion sheets.

What is needed, therefore, is a backlight module which can overcome the foregoing problems and improve illumination performance.

SUMMARY

A backlight module according to an exemplary embodiment of the present invention includes a flat CCFL having an output interface, and a light guiding plate. The output interface has a nano-material layer coated thereon. The light guiding plate includes an incidence interface, an emission interface, and a reflection interface, wherein the emission interface and the reflection interface respectively have nano-sized V-shaped grooves provided thereat. A pitch of the V-shaped grooves of the emission interface gradually increases from the incidence interface to a side of the light guiding plate distal from the incidence interface, and a pitch of the V-shaped grooves of the reflection interface gradually increases from the incidence interface to the side of the light guiding plate distal from the incidence interface.

An advantage of the backlight module is that it has improved illumination performance.

Another advantage of the backlight module is that the CCFL can provide improved efficiency of light utilization.

Other advantages and novel features will become more apparent from the following detailed description when taken in conjunction with the accompanying drawing, in which:

DETAILED DESCRIPTION OF THE PREFERRED EMBODIMENTS

Figure 1:
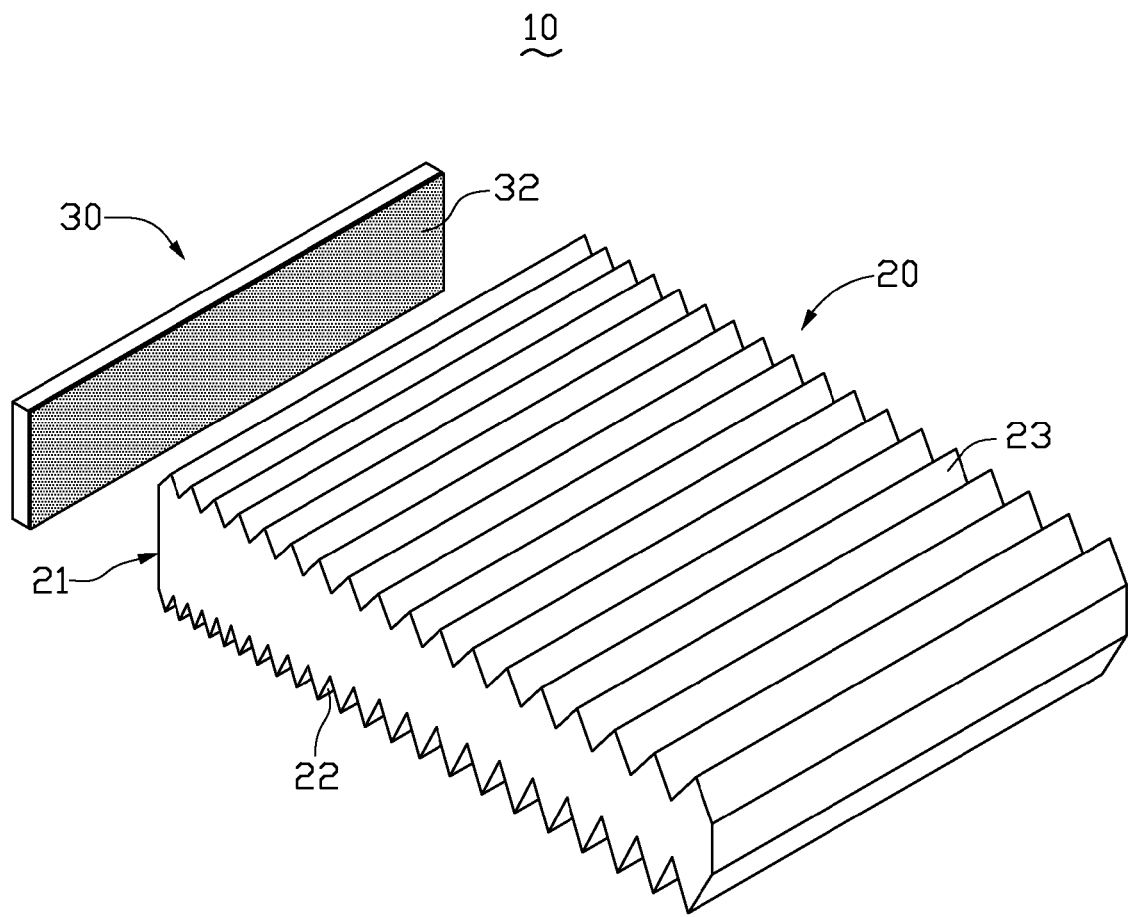
FIG. 1 is a simplified, exploded, isometric view of a backlight module according to a preferred embodiment of the present invention.

Referring to the drawing, according to an exemplary embodiment of the invention, a backlight module 10 of a display device includes a flat CCFL 30 as a light source and having an output surface or interface (not visible), and a plate-like light guiding member 20. The light guiding plate 20 is generally flat with a uniform thickness, and includes an incidence interface 21, an emission interface 23, and a reflection interface 22 opposite to the emission interface 23. The flat CCFL 30 is disposed adjacent the incidence interface 21.

According to one aspect of the embodiment, the flat CCFL 30 has a nano-material layer 32 coated on the output surface. A thickness of the nano-material layer 32 is in the range from 100 nm to 1000 nm, and preferably in the range from 200 nm to 500 nm. Sizes of particles of the nano-material layer 32 are in the range from 1 nm to 20 nm. The nano-material layer 32 can, for example, comprise nano-sized particles of glass, crystal or plastic materials, and preferably $SiO_2$ crystal or silicate glass. A distance from the nano-material layer 32 to the incidence interface 21 of the light guiding plate 20 is in the range from 10 μm to 100 μm.

Figure 2:
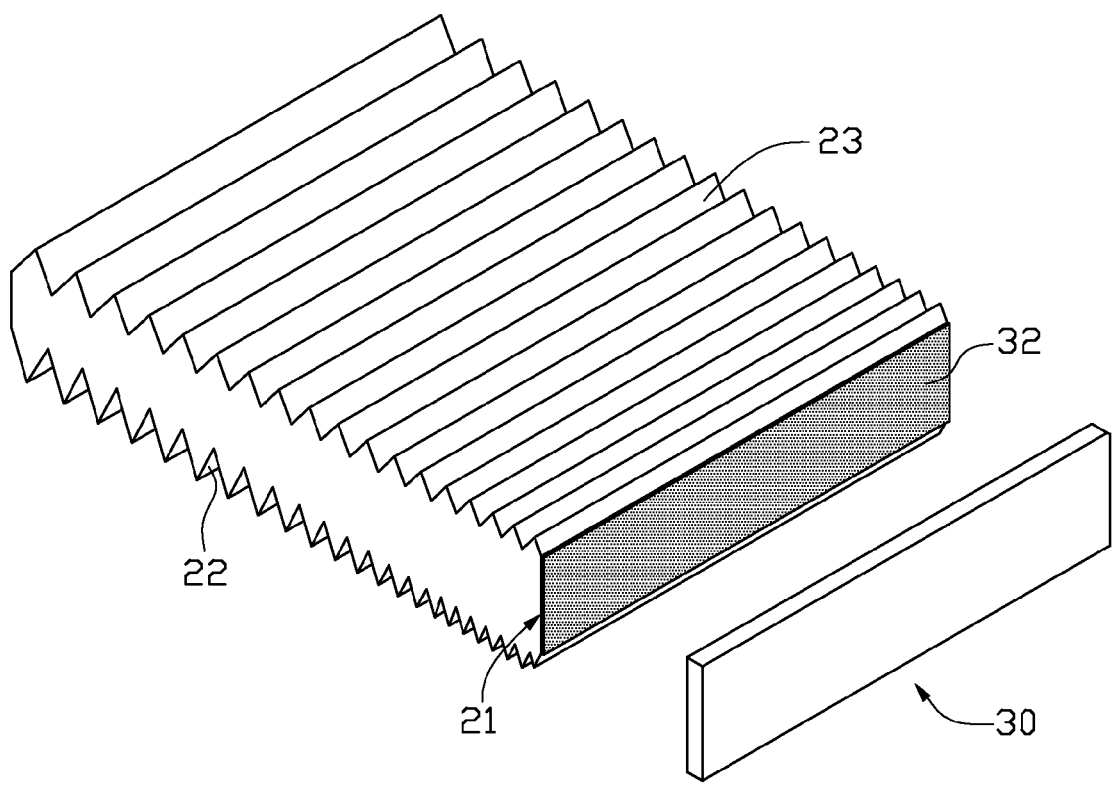
FIG. 2 is a simplified, exploded, isometric view of a backlight module according to another preferred embodiment of the present invention.

Referring to FIG. 2, according to another aspect of the embodiment, the nano-material layer 32 can alternatively be coated on the incidence interface 21 of the light guiding plate 20. A thickness of the nano-material layer 32 is in the range from 100 nm to 1000 nm, and preferably in the range from 200 nm to 500 nm. Sizes of particles of the nano-material layer 32 are in the range from 1 nm to 20 nm. The nano-material layer 32 can, for example, comprise nano-sized particles of glass, crystal or plastic materials, and preferably $SiO_2$ crystal or silicate glass. A distance from the nano-material layer 32 to the output surface of the flat CCFL 30 is in the range from 10 μm to 100 μm. Further, the nano-material layer 32 can be coated on both the output surface of the flat CCFL 30 and the incidence interface 21 of the light guiding plate 20. In such case, a distance from the nano-material layer 32 on the output surface to the nano-material layer 32 on the incidence interface 21 is in the range from 10 μm to 100 μm.

There are a plurality of V-shaped grooves provided at the emission interface 23. A pitch of the V-shaped grooves gradually increases from the incidence interface 21 to an end of the light guiding plate 20 opposite from the incidence interface 21. In the illustrated embodiment, the V-shaped grooves are contiguous; therefore as the pitch increases, sizes of the V-shaped grooves increase correspondingly. In other embodiments, the V-shaped grooves may be non-contiguous and uniformly sized, with the pitch thereof gradually increasing. In the illustrated embodiment, the V-shaped grooves close to the incidence interface 21 have a pitch in the range from 30 nm to 300 nm, and the V-shaped grooves distalmost from the incidence interface 21 have a pitch in the range from 50 nm to 500 nm.

There are a plurality of V-shaped grooves provided at the reflection interface 22. A pitch of the V-shaped grooves gradually increases from the incidence interface 21 to the end of the light guiding plate 20 opposite from the incidence interface 21. In the illustrated embodiment, the V-shaped grooves are contiguous; therefore as the pitch increases, sizes of the V-shaped grooves increase correspondingly. In other embodiments, the V-shaped grooves may be non-contiguous and uniformly sized, with the pitch thereof gradually increasing. In the illustrated embodiment, the V-shaped grooves close to the incidence interface 21 have a pitch in the range from 10 nm to 100 nm, and the V-shaped grooves distalmost from the incidence interface 21 have a pitch in the range from 30 nm to 300 nm.

Furthermore, the backlight module 10 may also include one or more reflector sheets, prism sheets and/or diffusion sheets stacked on the emission interface 23 of the light guiding plate 20. Moreover, instead of being flat with a uniform thickness, the light guiding plate 20 can be wedge-shaped.

In summary, unlike a conventional tubular CCFL, the flat CCFL 30 can be disposed very close to the incidence interface 21 of the light guiding plate 20. This improves the efficiency of coupling of light from the flat CCFL 30 to the light guiding plate 20, and enables the backlight module 10 to be more compact. The nano-material layer 32 coated on the output surface of the flat CCFL 30 and/or on the incident interface 21 of the light guiding plate 20 can greatly enlarge the operative surface area of the output surface and/or the incident interface 21. Thus transmitting light is uniformly diffused, and the illumination performance of the light output from the emission interface 23 is improved. The gradually increasing pitch of the nano-sized V-shaped grooves of the reflection interface 22 helps ensure that reflected light that reaches the emission interface 23 is uniform. The gradually increasing pitch of the nano-sized V-shaped grooves of the emission interface 23 helps ensure that light output from the emission interface 23 is uniform. By such means, the number of reflector sheets, prism sheets and/or diffusion sheets can be reduced, and some or all of such extra components can even be omitted. Thus the cost and the overall size of the backlight module 10 can be reduced.

It is to be further understood that the above-described embodiments illustrate the scope of the invention but do not restrict the scope of the invention. Variations may be made to the embodiments without departing from the spirit or scope of the invention as claimed herein.

What is claimed is:

1. A display device comprising:
   a light source for generating light in said display device, said light source comprising a substantially flat output interface in order to emit said light out of said light source through said flat output interface; and
   a light guide member for accepting said light from said light source in order for further transmission in said display device, said light guide member comprising a flat incident interface parallel facing said flat output interface of said light source so as to accept said light from said light source, an emission interface for emitting said light out of said light guide member, and a reflection interface substantially opposite to said emission interface, a plurality of nano-sized V-shaped grooves defined at each of said emission interface and said reflection interface.

2. The display device as described in claim 1, wherein at least one of said flat output interface of said light source and said flat incident interface of said light guide member is coated with a nano-material layer.

3. A backlight module, comprising:
   a flat CCFL (cold cathode fluorescent lamp), having a first nano-material layer coated on a light output interface thereof; and
   a light guiding plate comprising an incidence interface, an emission interface, and a reflection interface, wherein the emission interface and the reflection interface respectively have nano-sized V-shaped grooves provided thereat.

4. The backlight module as described in claim 3, wherein the first nano-material layer comprises nano-sized $SiO_2$ particles.

5. The backlight module as described in claim 3, wherein sizes of particles of the first nano-material layer are in the range from 1 nm to 20 nm.

6. The backlight module as described in claim 3, wherein a thickness of the first nano-material layer is in the range from 100 nm to 1000 nm.

7. The backlight module as described in claim 3, wherein a distance from the first nano-material layer to the incidence interface of the light guiding plate is in the range from 10 μm to 100 μm.

8. The backlight module as described in claim 3, wherein the incidence interface of the light guiding plate comprises a second nano-material layer coated thereon.

9. The backlight module as described in claim 8, wherein the second nano-material layer comprises nano-sized $SiO_2$ particles.

10. The backlight module as described in claim 8, wherein a distance from the first nano-material layer of the light output interface of the CCFL to the second nano-material layer of the incidence interface of the light guiding plate is in the range from 10 μm to 100 μm.

11. The backlight module as described in claim 3, wherein a pitch of the V-shaped grooves of the emission interface gradually increases from the incidence interface to a side of the light guiding plate distal from the incidence interface, and a pitch of the V-shaped grooves of the reflection interface gradually increases from the incidence interface to the side of the light guiding plate distal from the incidence interface.

12. The backlight module as described in claim 11, wherein the V-shaped grooves of the emission interface close to the incidence interface have a pitch in the range from 30 nm to 300 nm, and the V-shaped grooves of the emission interface distalmost from the incidence interface have a pitch in the range from 50 nm to 500 nm.

13. The backlight module as described in claim 11, wherein the V-shaped grooves of the reflection interface close to the incidence interface have a pitch in the range from 10 nm to 100 nm, and the V-shaped grooves of the reflection interface distalmost from the incidence interface have a pitch in the range from 30 nm to 300 nm.

14. A backlight module, comprising:
- a flat CCFL (cold cathode fluorescent lamp) having a light output interface; and
- a light guiding plate comprising an incidence interface having a first nano-material layer coated thereon, an emission interface, and a reflection interface substantially opposite to said emission interface, wherein said emission interface and said reflection interface each have a plurality of nano-sized V-shaped grooves provided thereat.

15. The backlight module as described in claim 14, wherein said first nano-material layer comprises nano-sized $SiO_2$ particles.

16. The backlight module as described in claim 14, wherein sizes of particles of said first nano-material layer are in the range from 1 nm to 20 nm.

17. The backlight module as described in claim 14, wherein a thickness of said first nano-material layer is in the range from 100 nm to 1000 nm.

18. The backlight module as described in claim 14, wherein a distance from an emission interface of the CCFL to said first nano-material layer is in the range from 10 μm to 100 μm.

19. The backlight module as described in claim 14, wherein the flat CCFL comprises a second nano-material layer coated on the light output interface thereof.

20. The backlight module as described in claim 14, wherein a pitch of the V-shaped grooves of the emission interface gradually increases from the incidence interface to a side of the light guiding plate distal from the incidence interface, and a pitch of the V-shaped grooves of the reflection interface gradually increases from the incidence interface to the side of the light guiding plate distal from the incidence interface.

* * * * *